United States Patent
Schaerges et al.

(10) Patent No.: US 10,387,373 B2
(45) Date of Patent: Aug. 20, 2019

(54) DISPLAY OF LOCATED TEXT IN A COMPUTER DOCUMENT

(71) Applicant: SAP SE, Walldorf (DE)

(72) Inventors: Hans-Peter Schaerges, Mannheim (DE); Heinz Willumeit, Wiesloch (DE)

(73) Assignee: SAP SE, Walldorf (DE)

( * ) Notice: Subject to any disclaimer, the term of this patent is extended or adjusted under 35 U.S.C. 154(b) by 733 days.

(21) Appl. No.: 14/945,066

(22) Filed: Nov. 18, 2015

(65) Prior Publication Data

US 2017/0139942 A1    May 18, 2017

(51) Int. Cl.
*G06F 16/00* (2019.01)
*G06F 16/16* (2019.01)
*G06F 16/14* (2019.01)

(52) U.S. Cl.
CPC .......... *G06F 16/168* (2019.01); *G06F 16/156* (2019.01)

(58) Field of Classification Search
CPC .......... G06F 17/30117; G06F 17/30112; G06F 17/30477; G06F 17/30126; G06F 3/0643; G06F 16/156; G06F 16/168
See application file for complete search history.

(56) References Cited

U.S. PATENT DOCUMENTS

| 8,478,763 B2* | 7/2013 | Anderson ......... G06F 17/30873 707/716 |
| 9,218,358 B2* | 12/2015 | Shaban Hussein .......... G06F 17/30165 |

* cited by examiner

*Primary Examiner* — Cheryl Lewis
(74) *Attorney, Agent, or Firm* — Jones Day

(57) ABSTRACT

Methods and systems of the present disclosure provide techniques to improve the display of and merge the results of one or more searches of a computer document in a simple, user-controlled manner. One method involves receiving a query, and searching files to identify any matches to the query. Another method involves visually marking the matches on the display so that the matches can be easily compared to the matches of subsequent queries. A method is also provided in which a user can pin the results of one query to a viewing pane of the display so that the results can be easily compared to the results of subsequent queries.

12 Claims, 14 Drawing Sheets

100

200

300

350

400

500

600

700

800

900

1000

1100

1200

1300

1400

1500

1600

1700

1800

1900

2000

2100

2200

DISPLAY OF LOCATED TEXT IN A COMPUTER DOCUMENT

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD OF THE DISCLOSURE

The present disclosure relates to methods and systems for searching a body of text on a computer. More specifically, it relates to merging results of one or more searches in a user-controlled way.

BACKGROUND

Word processing and computer code development sometimes require locating text somewhere in one or more documents. There are unique challenges to performing a search on a computer as compared with searching a physical document such as a printed book. For example, a reader may be able to remember that a particular passage appeared about half-way through the book and flip to the approximate location of the passage. However, documents in a computer are more difficult to spatially visualize in this manner. Further, when a search is performed across several files, it may be difficult to visualize the files being searched on a computer.

In some instances, searches can be more complex. For example, a user may not know the exact or required syntax of a search expression. Also, a user may perform a sequence of searches. For instance, a user may perform a first search followed by a second search based on the first one. However, performing a sequence of searches may have limited efficacy, especially when a large number of search results is returned each time. Conventional techniques for performing these types of searches are based on using search patterns with wildcards, which is a sequence of characters that define a search pattern. The search pattern is then used for pattern-matching in a body of text being searched. Conventional search techniques also allow a user to perform separate searches, with each search generating an independent results list. Thus, the inventors perceived a need in the art to make searching a document on a computer simpler and more efficient, including a need to link the independent results so that a user can more quickly find a search result.

DETAILED DESCRIPTION

Methods and systems of the present disclosure provide techniques to merge results of one or more searches in a simple, user-controlled manner. The following discussion uses the example of an integrated development environment ("IDE"), but the techniques described find application in other types of text searches such as searching documents and the like.

Figure 1:
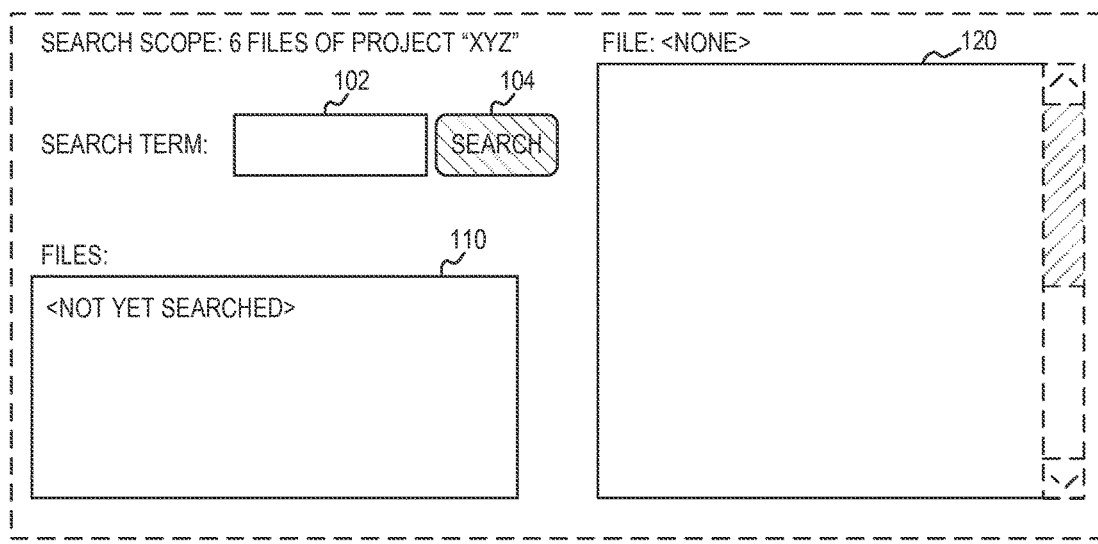
FIG. 1 shows a state of a graphical user interface prior to a search according to an embodiment of the present disclosure.

FIG. 1 shows a state of a graphical user interface 100 prior to a search according to an embodiment of the present disclosure. The interface 100 may include several areas 102, 110, and 120 for receiving input and/or providing output. The interface 100 may display information regarding a scope of a search (also referred to as a "search scope"). As shown, the search scope includes six files of project "XYZ." If the search scope changes, the interface 100 may be updated to reflect the search scope.

The interface 100 may include an input field 102 for receiving a search term (also referred to as a "query"). For example, the search term may be provided by a user. A search may be activated in response to selection of search button 104. In the embodiment shown, the search button 104 may be disabled when no search term is provided to the input field 102.

The interface 100 may include a viewing pane 110 for displaying a list of files. The list of files may be a list of files whose contents are searched for the search term provided to the input field 102. In an embodiment, files may be selected for further manipulation via the viewing pane 110. The interface 100 shows a state of the graphical user interface when no search term has been entered into the input field 102. For example, this may be indicated by displaying, "not yet searched," in viewing pane 110.

The interface 100 may include another viewing pane 120 for displaying content of a selected file of the viewing pane 110. For example, the area 120 may display content of a particular file or a preview of the content of a particular file. This may help a user to quickly see where the search term appears in a file. In an embodiment, the viewing pane 120 may include a scroll bar to accommodate content that does not fit into an initial view. For instance, scrolling may reveal additional content including highlighting of any matches (also known as "hits") to the search term as further described herein.

Figure 2:
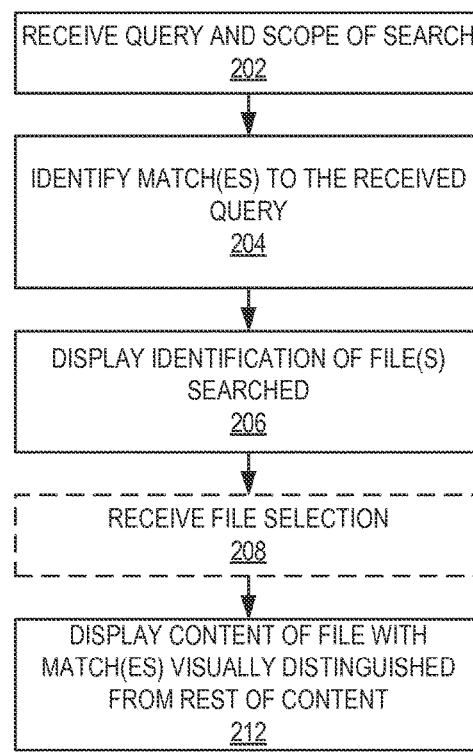
FIG. 2 is a flowchart of a method for performing a search according to an embodiment of the present disclosure.

FIG. 2 is a flowchart of a method 200 for performing a search according to an embodiment of the present disclosure. The method 200 may receive a query and a scope of a search (box 202). The method 200 may then search files within the received search scope to identify any matches to the received query (box 204). For example, the method 200 may identify whether the query appears in any of the files within the search scope. The method 200 may then display the identification of one or more files searched (box 206). The method 200 may display content of a file with content matching the query visually distinguished from the rest of the file's content (box 212). For example, the matching content may be highlighted, bolded, underlined or dashed to visually distinguish it from the rest of the file's content. This may help a user identify the search results and navigate between files. Optionally, the method 200 may receive a selection of one of the displayed search files (box 208), and display the content of the selected file with the matching content visually distinguished from the rest of the selected file's content (box 212). In an alternate embodiment, one of the files may be selected by default and its content displayed in a viewing pane. For example, the default file may be the first file containing a hit, a file containing the most number of hits, a file containing the least number of hits, or the like.

Figure 3A:
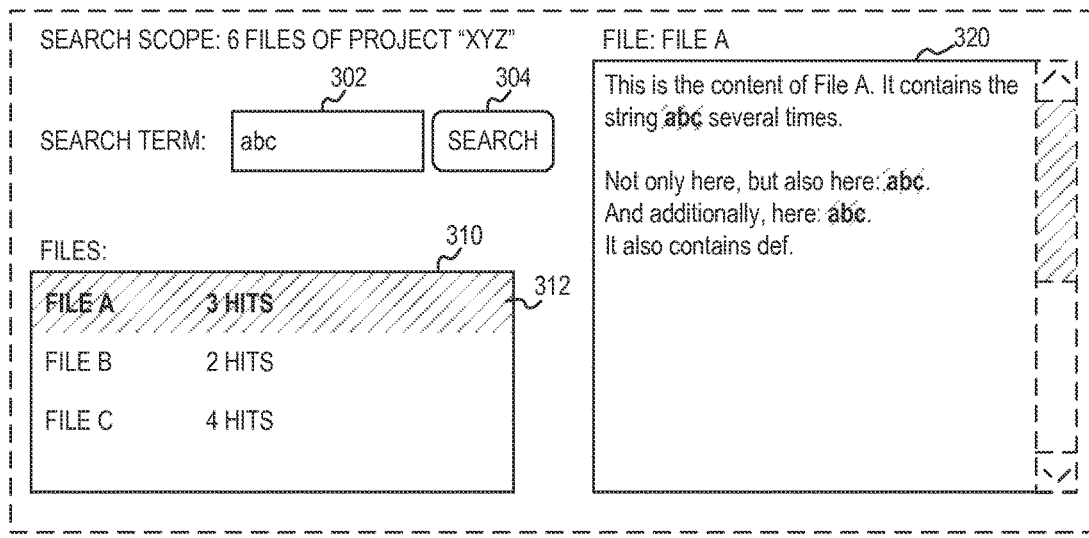
FIG. 3A shows a state of a graphical user interface after performing a search according to an embodiment of the present disclosure.

Method 200 will now be explained with reference to example interfaces shown in FIGS. 3A and 3B. FIG. 3A shows a state of a graphical user interface 300 after performing a search according to an embodiment of the present disclosure. The interface 300 may include several areas 302, 310 and 320 for receiving input and/or providing output. Area 302 is an input field for receiving a search term. Area 310 is a viewing pane for displaying a list of files, and area 320 is a viewing pane for displaying content of a selected file of the viewing pane 310.

A user may input a search term into input field 302. As shown, the search term in the example interface 300 is "abc." Upon selection of search button 304, search results may be displayed in the viewing pane 310 and the viewing pane 320. The search results may be generated according to the techniques described herein, e.g., method 200.

The viewing pane 310 may display those files containing at least one match to the input search term. In the example shown, the viewing pane 310 displays three files, File A, File B, and File C, which each contain matches to the input search term "abc." The viewing pane 310 may display the identification (also referred to as "name") of each file containing at least one hit and the quantity of hits for the corresponding file. As shown, File A includes three hits (e.g., three instances of "abc"), File B includes two hits (e.g., two instances of "abc"), and File C includes four hits (e.g., four instances of "abc").

The viewing pane 320 may display content of a file with content matching the query visually distinguished from the rest of the file's content. In the example shown, the viewing pane 320 displays the content of File A. This may be indicated by displaying, "File: File A." The content of File A may include visual distinctions to indicate matches to the search term. As shown, the search term "abc" has three matches in File A. Each match is shown in bolded font with a striped background to distinguish the match from the rest of File A's content. In an embodiment, a user may select one file via the viewing pane 310. In the example shown, File A is selected (312) and its content may be displayed in the viewing pane 320. In an alternate embodiment, one of the files in viewing pane 310 may be selected by default and its content displayed in the viewing pane 320.

Figure 3B:
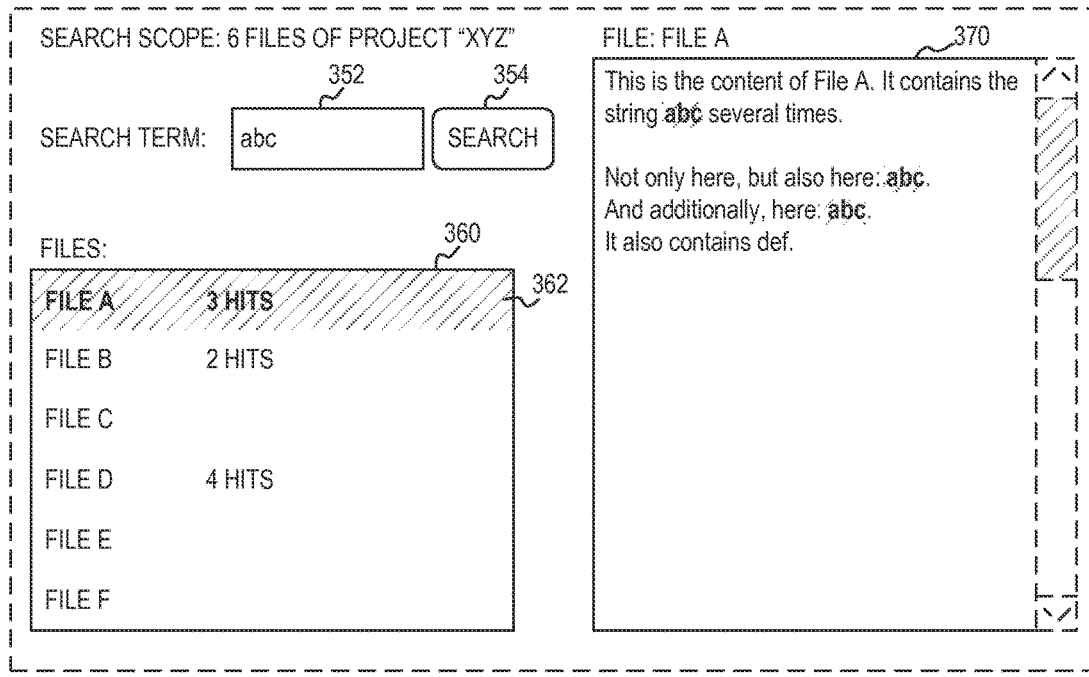
FIG. 3B shows a state of a graphical user interface after performing a search according to an embodiment of the present disclosure.

FIG. 3B shows a state of a graphical user interface 350 after performing a search according to an embodiment of the present disclosure. The interface 350 may include several areas 352, 360 and 370 for receiving input and/or providing output. Area 352 is an input field for receiving a search term. Area 360 is a viewing pane for displaying a list of files, and area 370 is a viewing pane for displaying content of a selected file of the viewing pane 360. As shown, the search term in the example interface 350 is "abc." Upon selection of search button 354, search results may be displayed in the viewing pane 360. In the example shown, File A is selected (362) and its content is displayed in viewing pane 370.

FIG. 3B differs from FIG. 3A in that the viewing pane 360 may display all files of the search scope, including files with and without search hits. As shown, File A, File B, . . . , and File F are displayed in the viewing pane 360, although some of the files (File C, File E, and File F) do not have hits. Displaying all files of the search scope in viewing pane 360 may provide a stable structure for the results list and allow for easy comparison across different searches, as further described herein. For instance, a first column including the file names (e.g., "File A," "File B," . . . , and "File F") is stable from search to search, while a second column including hit information is updated after each search.

In an embodiment, one or more controls of a graphical user interface may allow for marking of search results. Marking may make a sequence of searches more meaningful or intelligible to a user, as further described herein.

Figure 4:
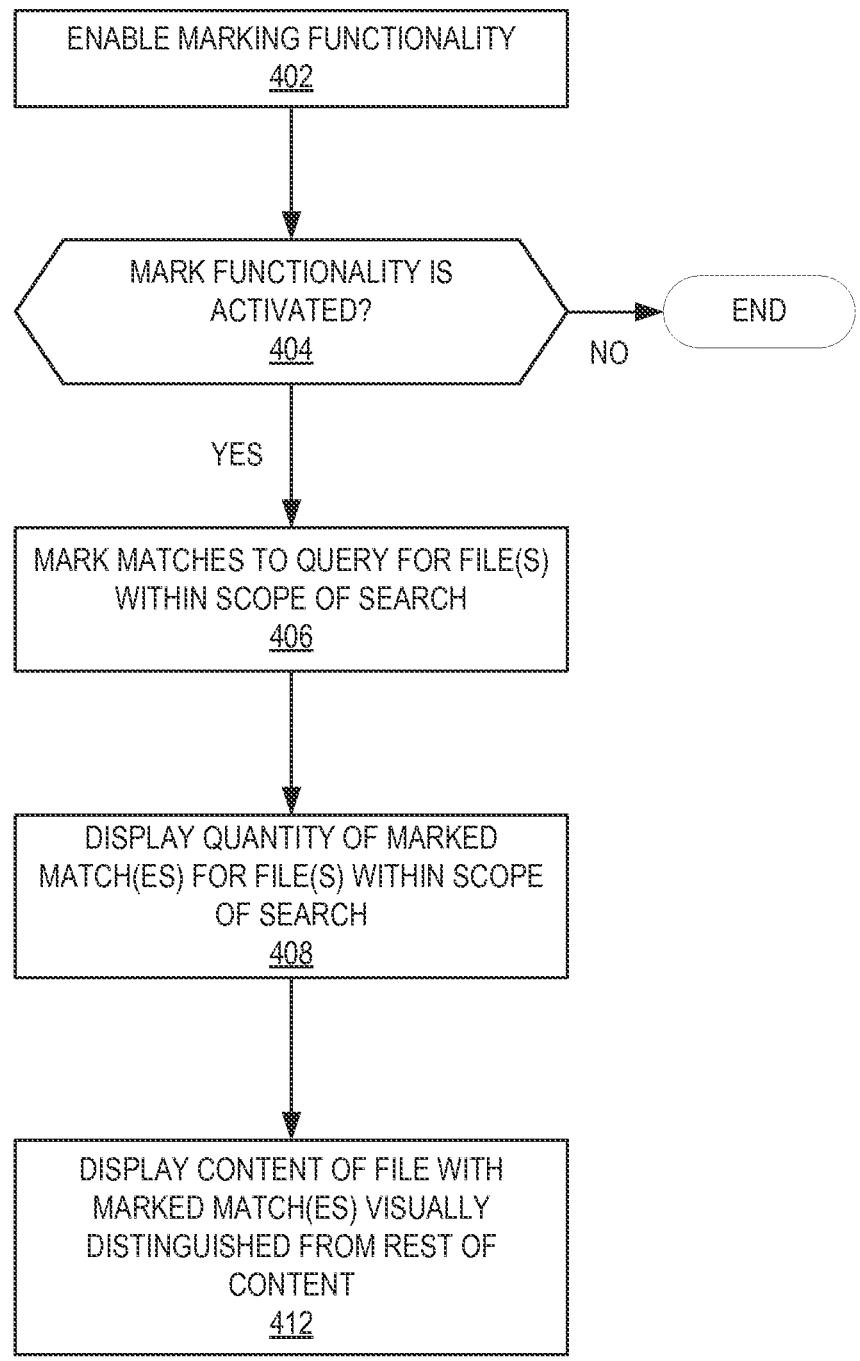
FIG. 4 is a flowchart of a method for marking search hits according to an embodiment of the present disclosure.

FIG. 4 is a flowchart of a method 400 for marking search hits according to an embodiment of the present disclosure. The method 400 may enable a marking functionality (box 402). For example, the method 400 may provide a user interface element on a user interface, and the element can be activated to mark hits of a search. As another example, the method 400 may indicate that a user interface element is selectable to activate a marking functionality. The method 400 may then determine whether the enabled marking functionality is activated (box 404). For example, a user selection of a user interface element may activate the marking functionality. If a marking functionality is not activated, the method 400 may terminate. Otherwise, if a marking functionality is activated, the method 400 may mark any matches to a search query for each file within a search scope (box 406). Marking may be visual differentiation of text from other text. For instance, marking may include placing a box around text, highlighting text, bolding text, underlining text, dashing text, displaying text in a particular color, displaying the background of text in a particular color, changing of typeface of text, and the like. The method 400 may display the quantity of marked matches for files in the scope of search (box 408). This may advantageously provide an easy-to-understand summary of search results. The method 400 may also display content of one of the files within the scope of the search (box 412). The content displayed may include marked matches that are visually distinguished from the rest of the file's content. The matches may be visually distinguished according to the techniques described herein.

Figure 5:
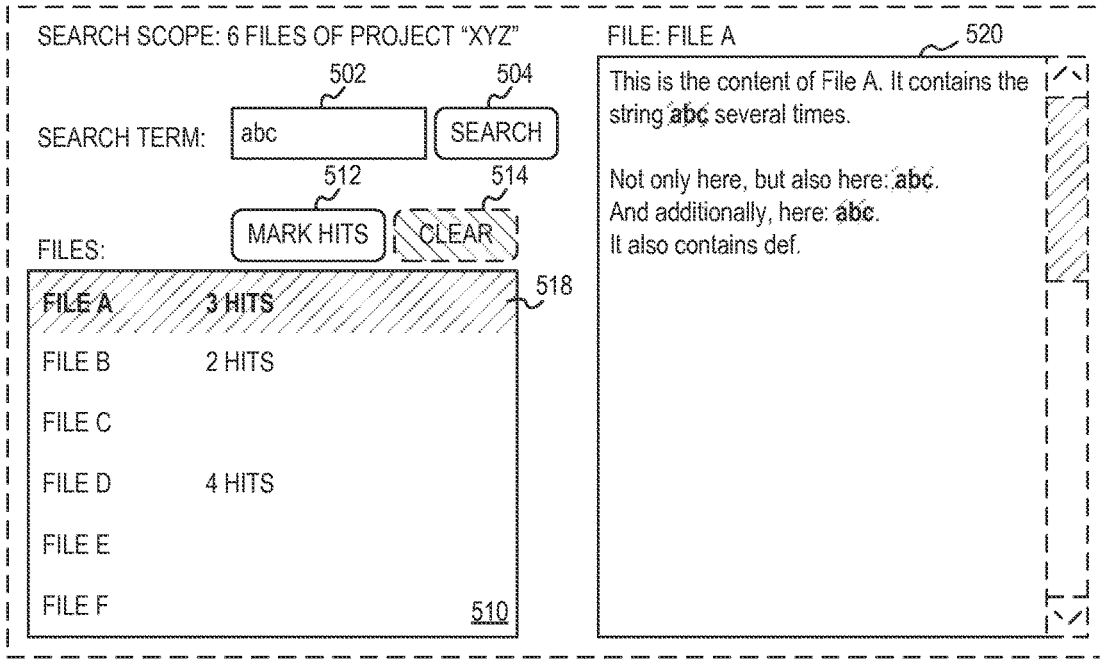
FIG. 5 shows a state of a graphical user interface prior to marking search hits according to an embodiment of the present disclosure.

Method 400 will now be explained with reference to example interfaces shown in FIGS. 5 to 11. FIG. 5 shows a state of a graphical user interface 500 prior to marking search hits in accordance with an embodiment of the invention. The interface 500 may include several areas 502, 520 and 510 for receiving input and/or providing output. Area 502 is an input field for receiving a search term. Area 510 is a viewing pane for displaying a list of files, and area 520 is a viewing pane for displaying content of a selected file of the viewing pane 510.

A user may input a search term into input field 502. As shown, the search term in the example of interface 500 is "abc." Upon selection of search button 504, search results may be displayed in the viewing pane 510 and the viewing pane 520. The search results may be generated according to the techniques described herein, e.g., method 200. In the example shown, the viewing pane 510 displays six files, File A, File B, . . . , and File F. The viewing pane 510 also indicates that there are three hits within File A, two hits within File B and four hits within File D. There are no hits within File C, File E or File F. Further, File A is selected (518), and its content is displayed in the viewing pane 520.

The interface 500 may include mark hits toggle button 512. Upon selecting button 512, marking may be activated. Upon releasing button 512, marking may be deactivated. Interface 500 may also include clear button 514. In the embodiment shown, the clear button 514 may be disabled when the marking has not been activated.

Figure 6:
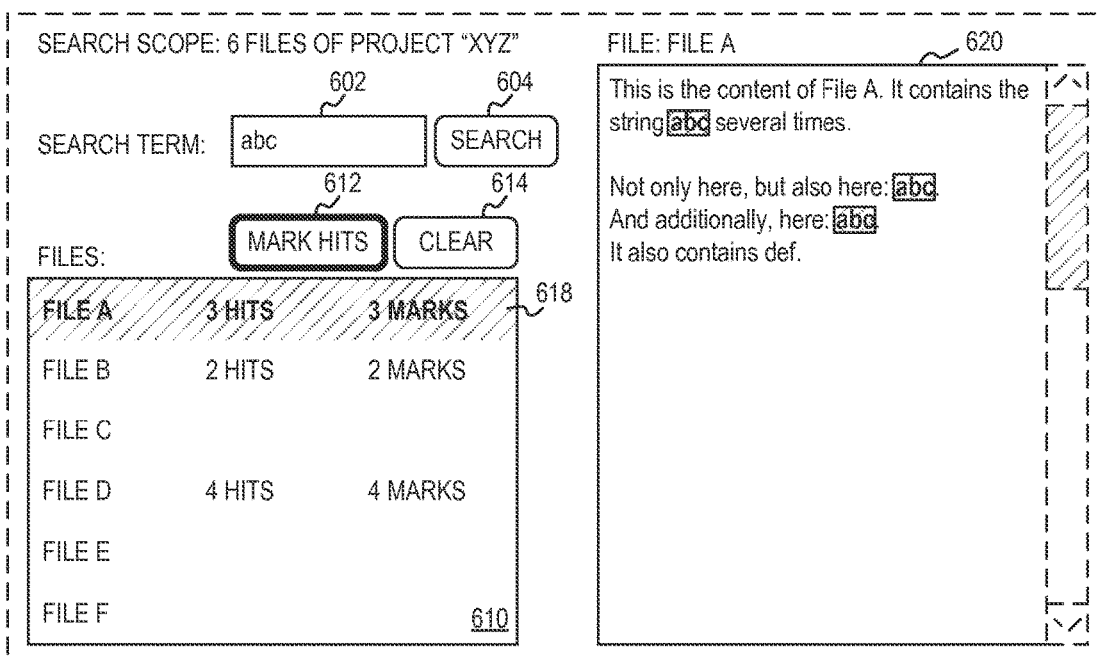
FIG. 6 shows a state of a graphical user interface after marking search hits of a first search according to an embodiment of the present disclosure.

FIG. 6 shows a state of a graphical user interface 600 after marking search hits of a first search in accordance with an embodiment of the invention. The interface 600 may include several areas 602, 620 and 610 for receiving input and/or providing output. Area 602 is an input field for receiving a search term. Area 610 is a viewing pane for displaying a list of files, and area 620 is a viewing pane for displaying content of a selected file of the viewing pane 610.

A user may input a search term into input field 602. As shown, the search term in the example interface 600 is "abc." Upon selection of search button 604, search results may be displayed in the viewing pane 610 and the viewing pane 620. The search results may be generated according to the techniques described herein, e.g., method 200. In the example shown, the viewing pane 610 displays six files, File A, File B, . . . , and File F. The viewing pane 610 also indicates that there are three hits within File A, two hits within File B and four hits within File D. There are no hits within File C, File E or File F. Further, File A is selected (618), and its content is displayed in the viewing pane 620.

Upon selecting the mark hits toggle button 612, the hits within File A, File B and File D are marked. Viewing pane 610 may display the quantity of marked hits for each file with at least one hit within the scope of the search. As shown, File A includes three marks, File B includes two marks, and File D includes four marks. Further, File A is selected, and its content, including the three marks, is displayed in viewing pane 620. The three marks are depicted as boxes that surround the search hits. In the embodiment shown, interface 600 may also include the clear button 614.

In another embodiment, upon releasing the mark hits toggle button 612, the hits within File A, File B and File D are unmarked. Viewing pane 610 may no longer display the quantity of marked hits for each file with at least one hit within the scope of the search.

Figure 7:
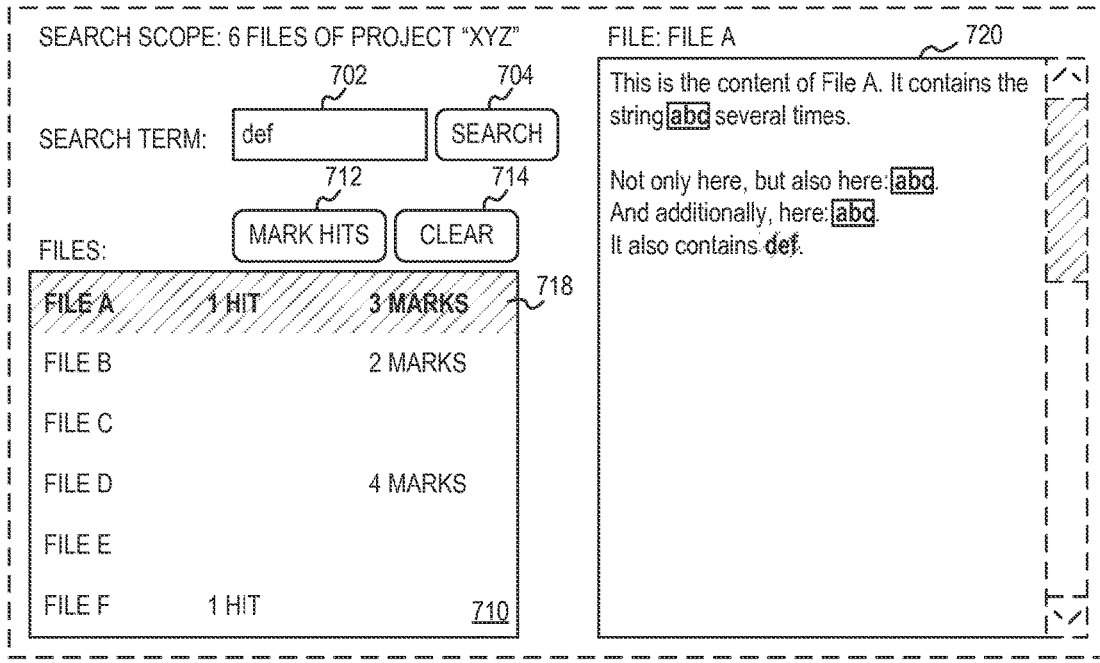
FIG. 7 shows a state of a graphical user interface after performing a second search according to an embodiment of the present disclosure.

FIG. 7 shows a state of a graphical user interface 700 after performing a second search according to an embodiment of the present disclosure. The interface 700 may include several areas 702, 720 and 710 for receiving input and/or providing output. Area 702 is an input field for receiving a search term. Area 710 is a viewing pane for displaying a list of files, and area 720 is a viewing pane for displaying content of a selected file of the viewing pane 710.

After performing a first search and marking the search results (e.g., see the discussion herein with reference to FIGS. 5 and 6), a user may input a second search term into input field 702. As shown, the search term in the example interface is "def." Upon selection of search button 704, search results may be displayed in the viewing pane 710. The quantity of hits for each file in the scope of search may also be displayed in viewing pane 710. As shown, File A and File F each include one hit of the search term, "def." Viewing pane 710 may also display the quantity of marks for each file within the scope of search in reference to the first search. For example, as shown, File A includes three marks for the search term, "abc." File B includes two marks for the search term, "abc," and File D includes four marks for the search term, "abc."

In the embodiment shown, File A is selected (718) and its content is displayed in viewing pane 720. One match to the search term, "def," is displayed in viewing pane 720. The match is shown in bold font with a striped background to distinguish the match from the rest of File A's content. The three instances of "abc" that were marked after the first search are also displayed in viewing pane 720. The marks are depicted as boxes around the three instances of "abc."

The interface 700 may also include the mark hits toggle button 712, and the clear button 714.

Figure 8:
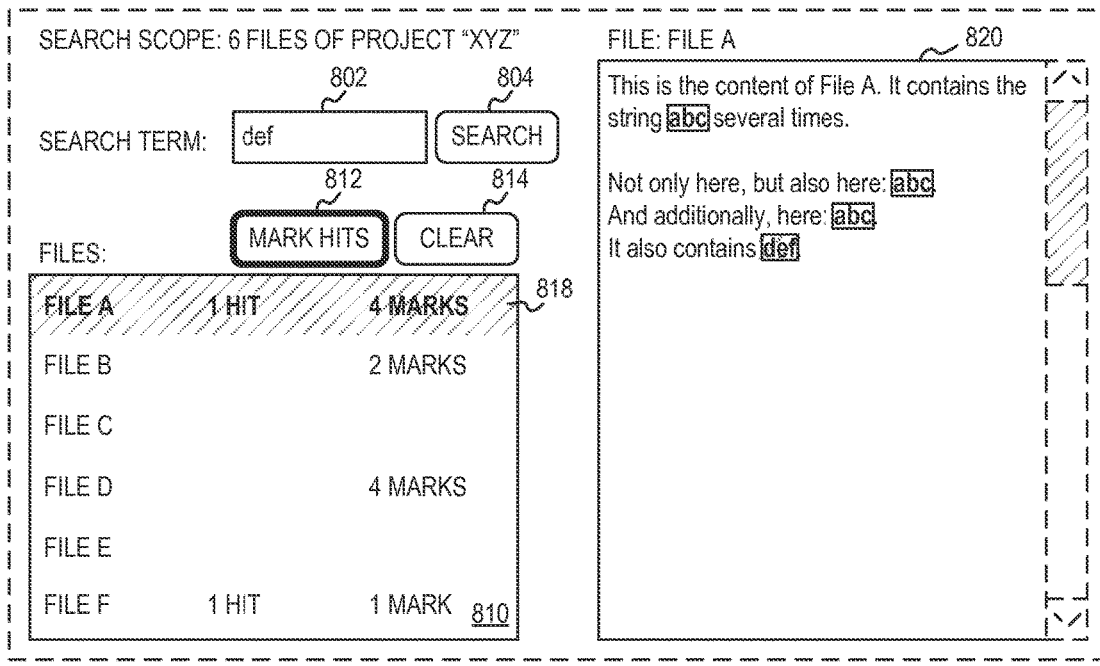
FIG. 8 shows a state of a graphical user interface after marking search hits of a second search according to an embodiment of the present disclosure.

FIG. 8 shows a state of a graphical user interface 800 after marking search hits of a second search in accordance with an embodiment of the invention. The interface 800 may include several areas 802, 820 and 810 for receiving input and/or providing output. Area 802 is an input field for receiving a search term. Area 810 is a viewing pane for displaying a list of files, and area 820 is a viewing pane for displaying content of a selected file of the viewing pane 810.

A user may input a search term into input field 802. As shown, the search term in the example interface 800 is "def." Upon selection of search button 804, search results may be displayed in the viewing pane 810 and the viewing pane 820. The search results may be generated according to the techniques described herein, e.g., method 200. In the example shown, the viewing pane 810 displays six files, File A, File B, . . . , and File F. The viewing pane 810 also indicates that there is one hit within File A, and one hit within File F.

Upon selecting the mark hits toggle button 812, the hits within File A and File F are marked. Viewing pane 810 may display the quantity of marked hits for each file within the scope of the search. The quantity of marked hits displayed is the aggregate number of marked hits for both the first and second searches. For example, with reference to File A, three hits were marked after the first search, and one hit was marked after the second search. Because the marked hits for the two searches are aggregated, a total of four marks is shown in viewing pane 810. Similarly, with reference to File B, two hits were marked after the first search, and no hits were marked after the second search. When the marked hits for the two searches are aggregated, a total of two marks is shown in area 810. The same process of aggregation can be applied to File D and File F. Aggregation does not apply to File C or File E because neither of these files contains hits from the first search or the second search.

As shown, File A is selected (818) in viewing pane 810, and its content, including the four marks, is displayed in viewing pane 820. The four marks are depicted as boxes around the hits for the first and second searches. In an alternate embodiment, with respect to File A, for example, a user may delete the mark from the second search by releasing the mark hits toggle button 812. Upon releasing button 812, viewing pane 820 may display the marks from the first search, as shown in FIG. 7. Further, viewing pane 810 may display the quantity of marks for each file in the scope of search for the search term, "abc," as shown in FIGS. 6 and 7. In another embodiment, interface 800 may include the clear button 814.

Figure 9:
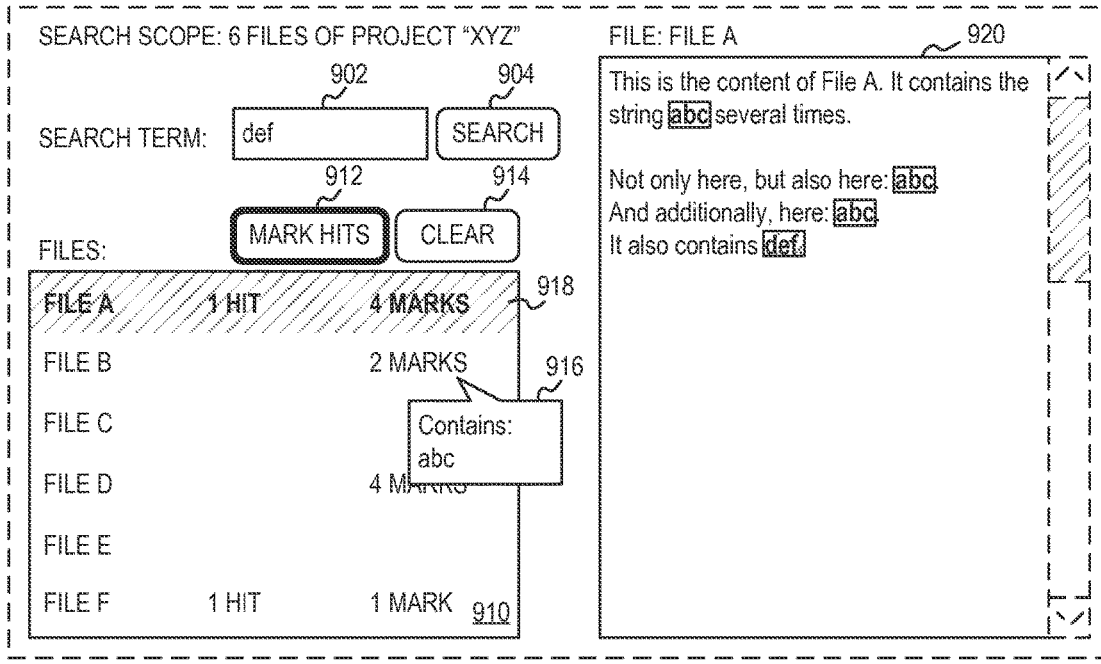
FIG. 9 shows a state of a graphical user interface after marking search hits of a second search according to an embodiment of the present disclosure.

FIG. 9 shows a state of a graphical user interface 900 after marking search hits of a second search in accordance with an embodiment of the invention. Like FIG. 8, the interface 900 may include several areas 902, 920 and 910 for receiving input and/or providing output. Area 902 is an input field for receiving a search term. Area 910 is a viewing pane for displaying a list of files, and area 920 is a viewing pane for displaying content of a selected file of the viewing pane 910.

A user may input a search term into input field 902. As shown, the search term in the example interface 900 is "def." Upon selection of search button 904, search results may be displayed in the viewing pane 910 and the viewing pane 920. The search results may be generated according to the techniques described herein, e.g., method 200. In the example shown, the viewing pane 910 displays six files, File A, File B, . . . , and File F. The viewing pane 910 also displays the quantity of hits for each of the files with respect to the search term, "def."

Upon selecting the mark hits toggle button 912, the hits within File A and File F are marked. Viewing pane 910 may display the quantity of marked hits for each file within the scope of the search. As explained with reference to FIG. 8, the quantity of marked hits displayed is the aggregate number of marked hits for both the first and second searches. Further, in the example shown, File A is selected (918) and its content may be displayed in the viewing pane 920.

FIG. 9 differs from FIG. 8 in that it shows a tooltip (916) over the quantity of marks for File B. The tooltip 916 may provide information about the quantity of marks. In the example shown, tooltip 916 displays, "Contains: abc." This indicates that the two marks for File B refer to the search term, "abc." In an alternate embodiment, viewing pane 910 may contain a tooltip that provides information about the quantity of marks for File A. For example, a tooltip may display, "Contains: abc, def." This indicates that the four marks for File A refer to the search terms, "abc" and "def."

In another embodiment, interface 900 may contain the clear button 914.

Figure 10:
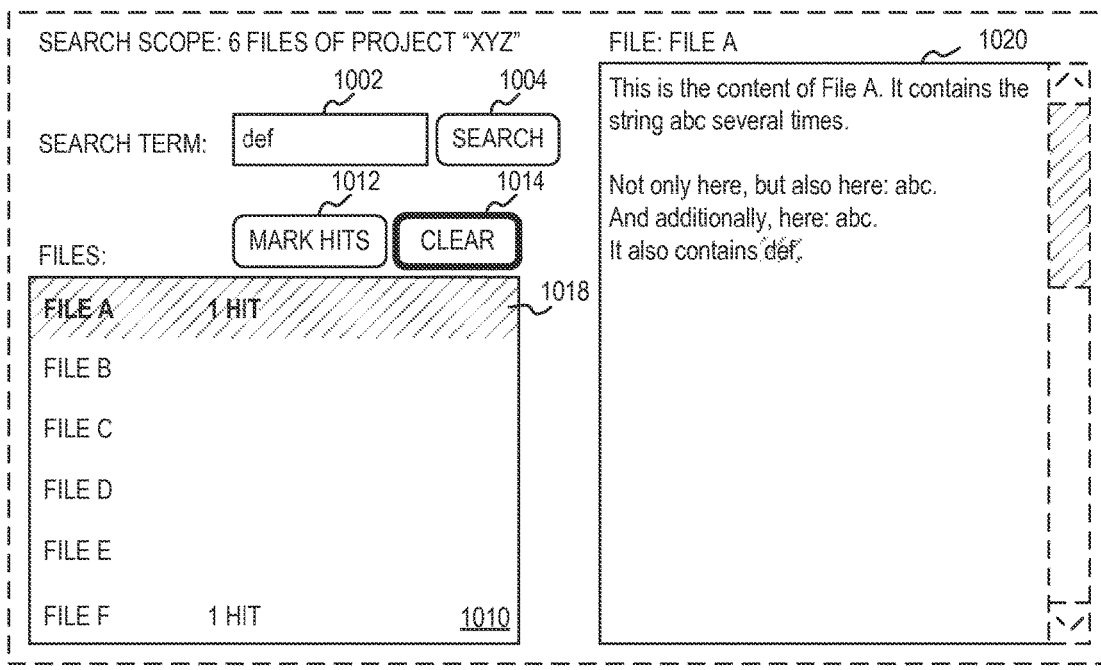
FIG. 10 shows a state of a graphical user interface after clearing marked search hits according to an embodiment of the present disclosure.

FIG. 10 shows a state of a graphical user interface 1000 after clearing marked search hits in accordance with an embodiment of the invention. Like FIG. 9, the interface 1000 may include several areas 1002, 1020 and 1010 for receiving input and/or providing output. Area 1002 is an input field for receiving a search term. Area 1010 is a viewing pane for displaying a list of files, and area 1020 is a viewing pane for displaying content of a selected file of the viewing pane 1010.

A user may input a search term into input field 1002. As shown, the search term in the example interface 1000 is "def." Upon selection of search button 1004, search results may be displayed in the viewing pane 1010 and the viewing pane 1020. The search results may be generated according to the techniques described herein, e.g., method 200. In the example shown, the viewing pane 1010 displays six files, File A, File B, . . . , and File F. The viewing pane 1010 also displays the quantity of hits for each of the files with respect to the search term, "def." In the example embodiment shown, File A includes one hit and File F includes one hit. Further, File A is selected (1018), and its content may be displayed in the viewing pane 1020.

Upon selecting the mark hits toggle button 1012, the hits within File A and File F are marked. Viewing pane 1010 may display the quantity of marked hits for each file within the scope of the search. As explained with reference to FIG. 8, the quantity of marked hits displayed is the aggregate number of marked hits for both the first and second searches. However, upon selecting the clear button 1014, the quantity of marked hits for all prior searches is cleared (also referred to as "deleted"). As shown, upon selecting the clear button 1014, viewing pane 1010 displays no quantities of marked hits. In another embodiment, after selecting the clear button 1014, the button 1014 may be disabled.

Figure 11:
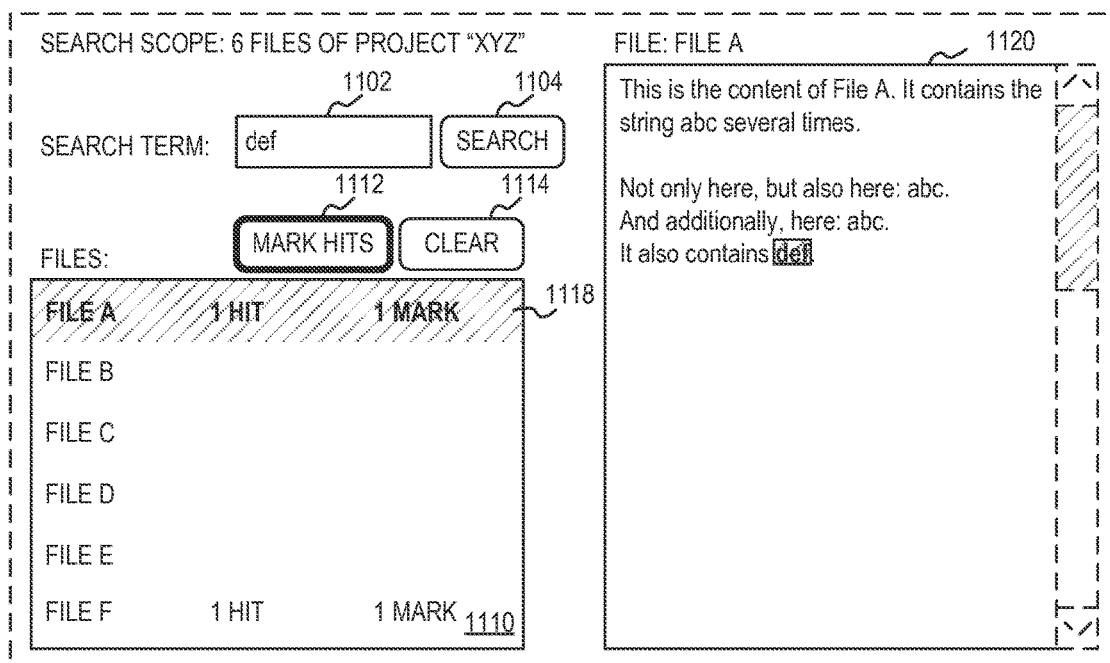
FIG. 11 shows a state of a graphical user interface after marking search hits according to an embodiment of the present disclosure.

FIG. 11 shows a state of a graphical user interface 1100 after marking search hits in accordance with an embodiment of the invention. The state of the graphical user interface 1100 may occur subsequent to the clearing described in reference to FIG. 10. The interface 1100 may include several areas 1102, 1120 and 1110 for receiving input and/or providing output. Area 1102 is an input field for receiving a search term. Area 1110 is a viewing pane for displaying a list of files, and area 1120 is a viewing pane for displaying content of a selected file of the viewing pane 1110.

A user may input a search term into input field 1102. As shown, the search term in the example interface 1100 is "def." Upon selection of search button 1104, search results may be displayed in the viewing pane 1110 and the viewing pane 1120. The search results may be generated according to the techniques described herein, e.g., method 200. In the example shown, the viewing pane 1110 displays six files, File A, File B, . . . , and File F. The viewing pane 1110 also indicates that there is one hit within File A and one hit within File F. Further, File A is selected (1118), and its content is displayed in the viewing pane 1120.

Upon selecting the mark hits toggle button 1112, the hits within File A and File F are marked. Viewing pane 1110 may display the quantity of marked hits for each file within the scope of the search. As shown, File A includes one mark, and File F includes one mark.

In the embodiment shown, interface 1100 may also include the clear button 1114.

Figure 12:
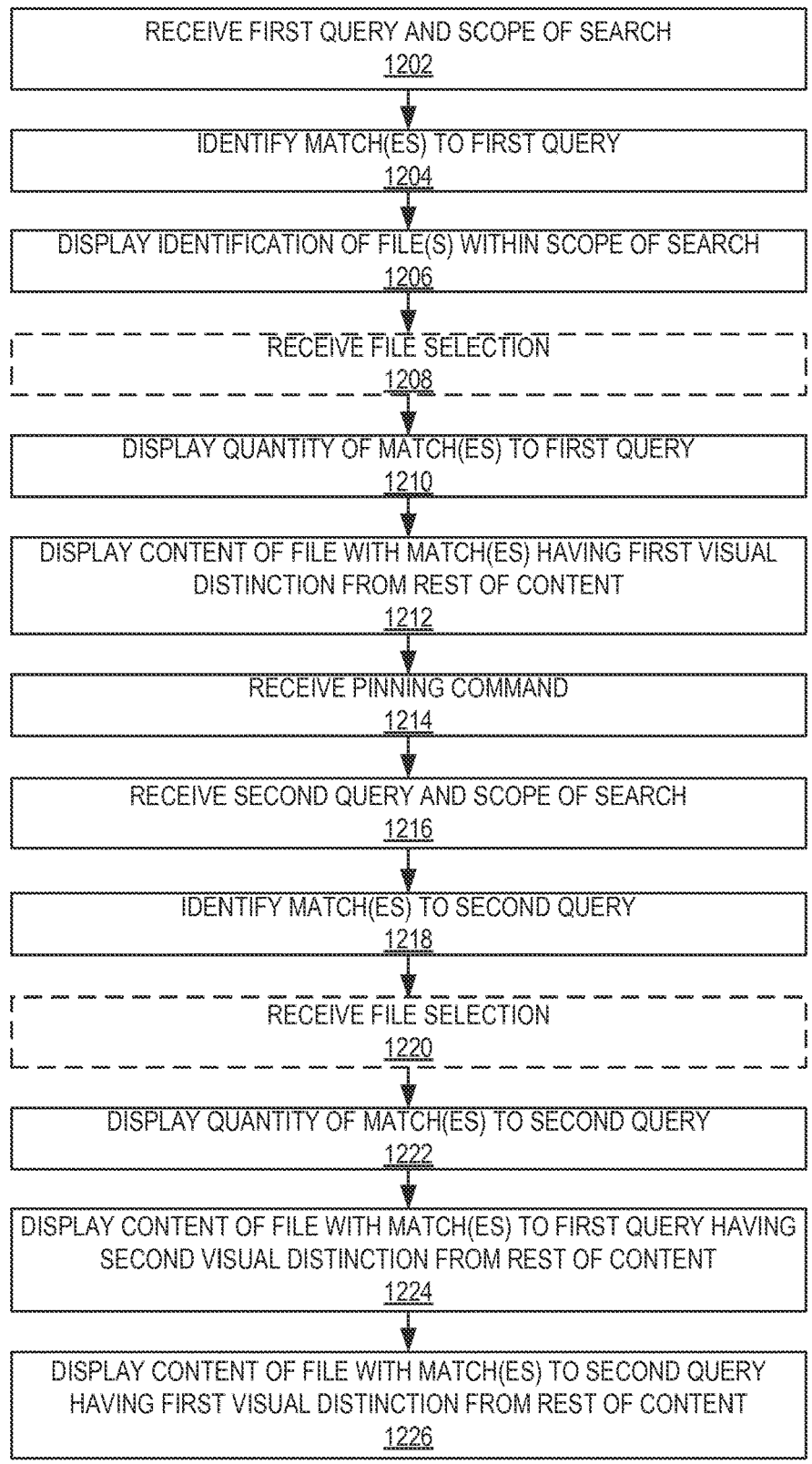
FIG. 12 is a flowchart of a method for performing a sequence of searches according to an embodiment of the present disclosure.

FIG. 12 is a flowchart of a method 1200 for performing a sequence of searches according to an embodiment of the present disclosure. The method 1200 may receive a first query and a scope of a search (box 1202). The method 1200 may then search files within the received search scope to identify any matches to the received first query (box 1204). For example, the method 1200 may identify whether the first query appears in any of the files within the search scope. The method 1200 may then display the identification of one or more files searched (box 1206). The method 1200 may then display the quantity of matches to the first query for each file within the scope of the search (box 1210). The method 1200 may also display the content of a file that matches the first query, with the matching content having a first visual distinction from the rest of the file's content (box 1212). For example, the first visual distinction may include highlighting, bolding, underlining or dashing text. This may help a user identify the search results and navigate between files. The method 1200 may then receive a pinning command (box 1214).

The method 1200 may then receive a second query and a scope of a search (box 1216). The method 1200 may then search files within the received search scope to identify any matches to the received second query (box 1218). For example, the method 1200 may identify whether the second query appears in any of the files within the search scope. The method 1200 may then display the quantity of matches to the second query for each file within the scope of search (box 1222). The method 1200 may also display the content of a file that matches the first query, with the matching content having a second visual distinction from the rest of the file's content (box 1224). For example, the second visual distinction may include highlighting, bolding, underlining or dashing text. Further, the second visual distinction may be different from the first visual distinction. This may help a user identify the search results and navigate between files. The method 1200 may also display the content of a file that matches the second query, with the matching content having the first visual distinction from the rest of the file's content (box 1226). As noted herein, the first visual distinction may include highlighting, bolding, underlining or dashing text.

Optionally, the method 1200 may involve receiving a selection of one of the displayed search files (boxes 1208 and 1220). In an alternate embodiment, one of the files may be selected by default and its content displayed in a viewing pane. For example, the default file may be the first file containing a hit, a file containing the most number of hits, a file containing the least number of hits, or the like.

Figure 13:
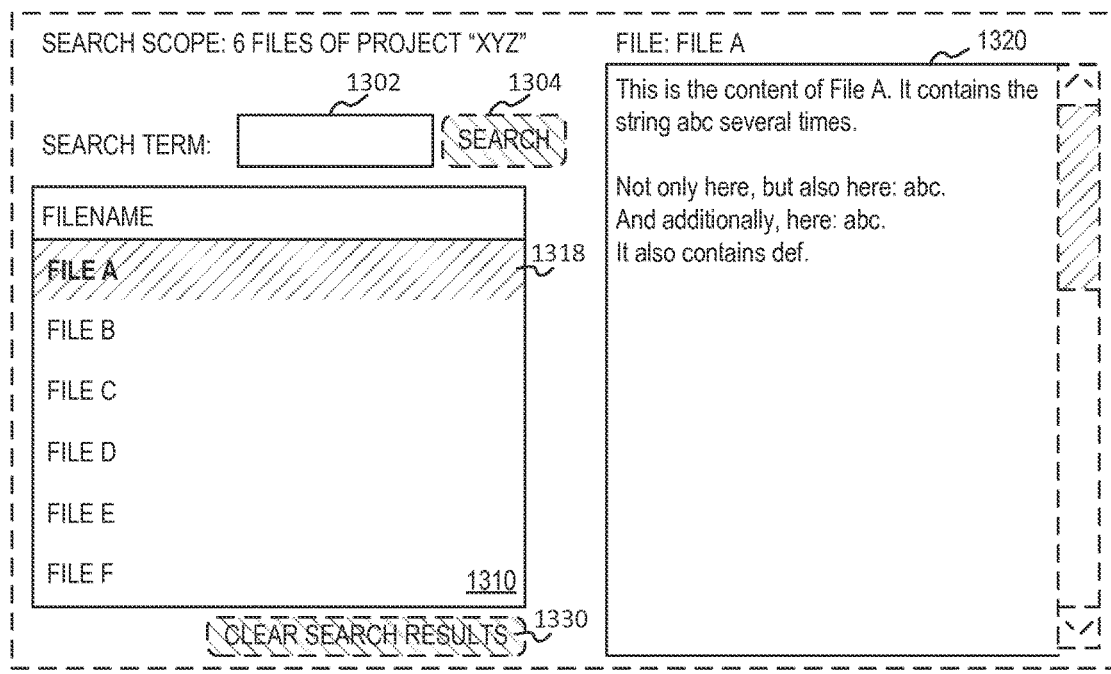
FIG. 13 shows a state of a graphical user interface before a sequence of searches is performed according to an embodiment of the present disclosure.

Method 1200 will now be explained with reference to example interfaces shown in FIGS. 13-20. FIG. 13 shows a state of a graphical user interface 1300 before a sequence of searches is performed. The interface 1300 may include several areas 1302, 1320 and 1310 for receiving input and/or providing output. The interface 1300 may display information regarding a scope of a search. As shown, the search scope includes six files of project "XYZ." If the search scope changes, the interface 1300 may be updated to reflect the search scope.

The interface 1300 may include an input field 1302 for receiving a search term. For example, the search term may be provided by a user. A search may be activated in response to selection of search button 1304. In the embodiment shown, the search button 1304 may be disabled when no search term is provided to the input field 1302. Further, interface 1300 may also include a clear search results button 1330, which may be activated to delete search results. As shown, the clear search results button 1330 may be disabled when no search has been performed.

The interface 1300 may include a viewing pane 1310 for displaying a list of files. The list of files may be a list of files whose contents are searched for the search term provided to the input field 1302. In an embodiment, files may be selected for further manipulation via the viewing pane 1310.

As shown, viewing pane 1310 displays the identification of six files, "File A," "File B," . . . , and "File F". Further, File A is selected (1318), and its content may be displayed in the viewing pane 1320. In an alternate embodiment, viewing pane 1310 may display a tooltip over a file's identification. The tooltip may provide information about a file's identification, including the full file name and path.

Figure 14:
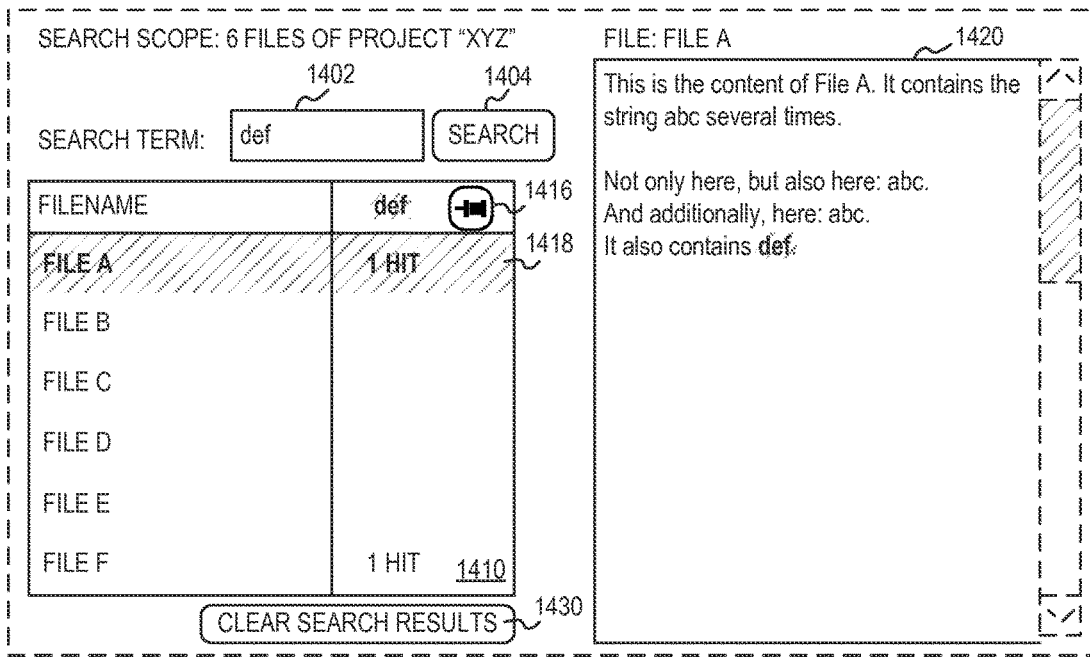
FIG. 14 shows a state of a graphical user interface after performing a search according to an embodiment of the present disclosure.

FIG. 14 shows a state of a graphical user interface 1400 after performing a search according to an embodiment of the present disclosure. The interface 1400 may include several areas 1402, 1410, and 1420 for receiving input and/or providing output. Area 1402 is an input field for receiving a search term. Area 1410 is a viewing pane for displaying a list of files, and area 1420 is a viewing pane for displaying content of a selected file of the viewing pane 1410. As shown, the search term in the example interface 1400 is "def." Upon selection of search button 1404, search results may be displayed in the viewing pane 1410. The viewing pane 1410 may also display the quantity of hits for each file in the scope of the search. In the example shown, File A is selected (1418) and its content is displayed in viewing pane 1420. Further, interface 1400 may also include the pinning toggle button 1416 and the clear search results button 1430.

Figure 15:
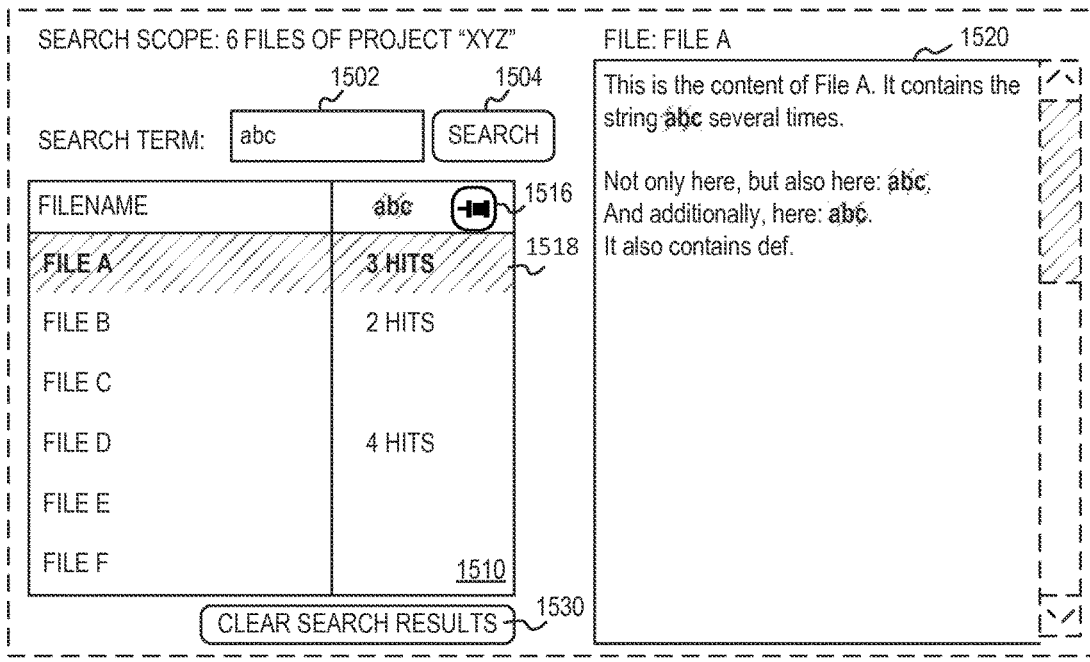
FIG. 15 shows a state of a graphical user interface after performing a search according to an embodiment of the present disclosure.

FIG. 15 shows a state of a graphical user interface 1500 after performing a search according to an embodiment of the present disclosure. The interface 1500 may appear subsequent to the interface 1400 discussed herein with reference to FIG. 14. The interface 1500 may include several areas 1502, 1510, and 1520 for receiving input and/or providing output. Area 1502 is an input field for receiving a search term. Area 1510 is a viewing pane for displaying a list of files, and area 1520 is a viewing pane for displaying content of a selected file of the viewing pane 1510. As shown, the search term in the example interface 1500 is "abc." Upon selection of search button 1504, search results may be displayed in the viewing pane 1510. The search results may replace the results of a prior search, such as those displayed in viewing pane 1410 of FIG. 14. The viewing pane 1510 may also display the quantity of hits for each file in the scope of the search. In the example shown, File A is selected (1518) and its content is displayed in viewing pane 1520. Further, interface 1500 may also include the pinning toggle button 1516 and the clear search results button 1530.

Figure 16:
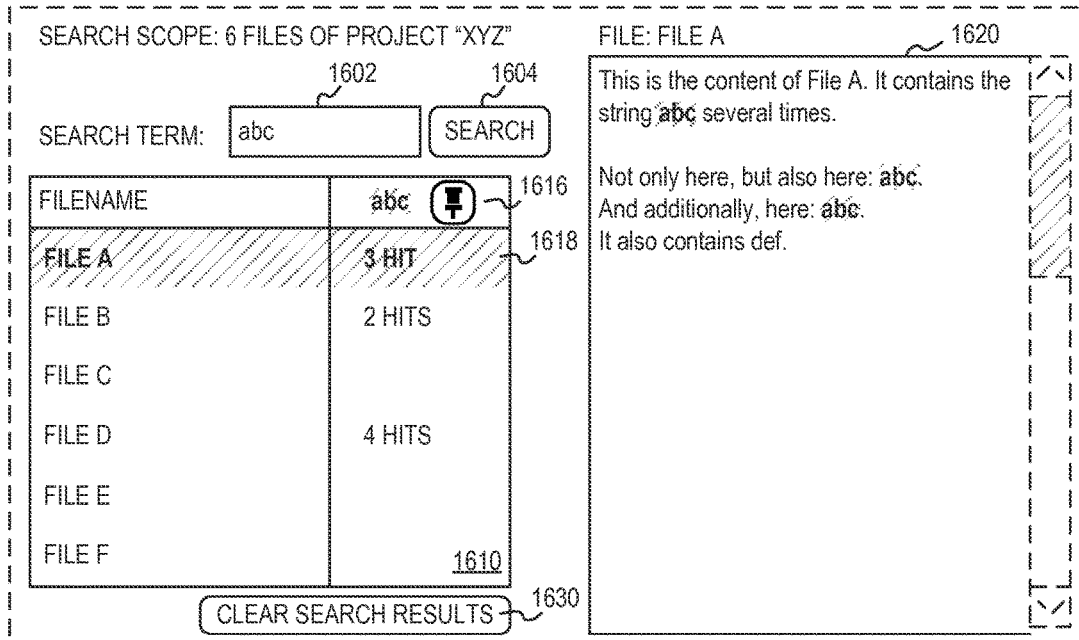
FIG. 16 shows a state of a graphical user interface after performing a search according to an embodiment of the present disclosure.

FIG. 16 shows a state of a graphical user interface 1600 after performing a search according to an embodiment of the present disclosure. The interface 1600 may include several areas 1602, 1610, and 1620 for receiving input and/or providing output. Area 1602 is an input field for receiving a search term. Area 1610 is a viewing pane for displaying a list of files, and area 1620 is a viewing pane for displaying content of a selected file of the viewing pane 1610. As shown, the search term in the example interface 1600 is "abc." Upon selection of search button 1604, search results may be displayed in the viewing pane 1610. The viewing pane 1610 may also display the quantity of hits for each file in the scope of the search. In the example shown, File A is selected (1618) and its content is displayed in viewing pane 1620. In viewing pane 1620, the search hits are displayed with a first visual indication. For example, the first visual indication may involve highlighting, bolding, underlining or dashing text. Further, interface 1600 may include the pinning toggle button 1616 and the clear search results button 1630. The clear search results button 1630 may be selected to delete the list of files and the quantities of hits for the search term "abc" from viewing pane 1610. In one embodiment, upon selecting clear search results button 1630, viewing pane 1610 may no longer display the quantity of hits for each file in the scope of the search, as shown in FIG. 13. Further, viewing pane 1620 may no longer display the search hits with a first visual indication, as shown in FIG. 13. In another embodiment, upon selecting clear search results button 1630, viewing pane 1620 may not display the content of a file.

The interface 1600 may appear subsequent to the interface 1500 discussed herein with reference to FIG. 15. FIG. 16 differs from FIG. 15 in that the pinning toggle button 1616 is selected in FIG. 16 while the pinning toggle button 1516 is released in FIG. 15. A user may select the pinning toggle button 1616 to pin the quantities of hits for the search to the viewing pane 1610. This allows the user to view the quantities of hits for the search after a subsequent search or searches. In an embodiment, after a user selects the pinning toggle button 1616, the user may release button 1616 if the user wishes not to pin the quantities of hits for the search to the viewing pane 1610.

Figure 17:
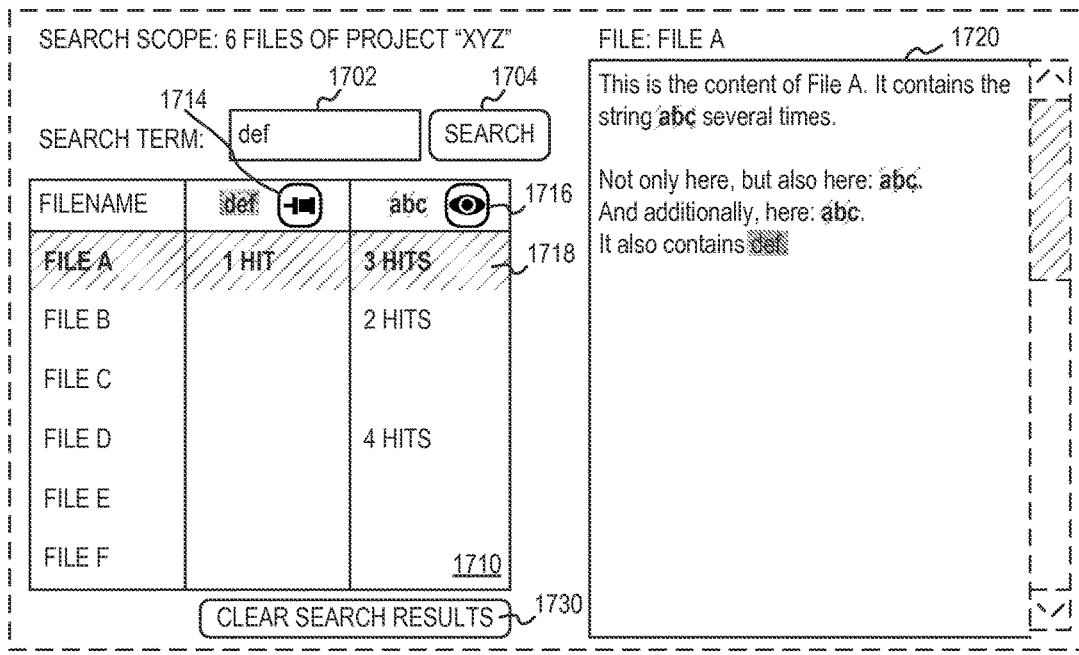
FIG. 17 shows a state of a graphical user interface after performing a search according to an embodiment of the present disclosure.

FIG. 17 shows a state of a graphical user interface 1700 after performing a search according to an embodiment of the present disclosure. The interface 1700 may appear subsequent to the interface 1600. The interface 1700 may include several areas 1702, 1710, and 1720 for receiving input and/or providing output. Area 1702 is an input field for receiving a search term. Area 1710 is a viewing pane for displaying a list of files, and area 1720 is a viewing pane for displaying content of a selected file of the viewing pane 1710.

As shown, the search term in the example interface 1700 is "def." Upon selection of search button 1704, search results may be displayed in the viewing pane 1710. The viewing pane 1710 also displays the pinned quantities of hits for the search term, "abc," as described herein with reference to FIG. 16. The viewing pane 1710 may also display the quantity of hits for each file in the scope of the search for the search term, "def." In the example shown, File A is selected (1718) and its content is displayed in viewing pane 1720.

In viewing pane 1720, the search hit for the search term "def" is displayed with a first visual indication. For example, the first visual indication may involve highlighting, bolding, underlining or dashing text. In viewing pane 1720, the search hits for the search term "abc" are displayed with a second visual indication. For example, the second visual indication may involve highlighting, bolding, underlining or dashing text. Further, interface 1700 may include a pinning toggle button 1714 to pin the quantities of hits for the search term "def" to the viewing pane 1710. This allows the user to view the quantities of hits for the search after a subsequent search or searches. In an embodiment, after a user selects the pinning toggle button 1714, the user may release button 1714 if the user wishes not to pin the quantities of hits for the search to the viewing pane 1710.

Interface 1700 may also include eye toggle button 1716, which can be selected to delete the second visual indication for the search term "abc." In an embodiment, after a user selects the eye toggle button 1716, the user may release button 1716 if the user wishes to view the second visual indication for the search term "abc."

Interface 1700 may also include the clear search results button 1730, which can be used to delete the list of files and the quantities of hits for the search terms, "def" and "abc," from viewing pane 1710. In one embodiment, upon selecting clear search results button 1730, viewing pane 1710 may no longer display the search results for the search terms, "def," and "abc," as shown in FIG. 13. Further, viewing pane 1720 may no longer display the search hits for the search terms, "def" and "abc," as shown in FIG. 13. In another embodiment, upon selecting clear search results button 1730, viewing pane 1720 may not display the content of a file.

Figure 18:
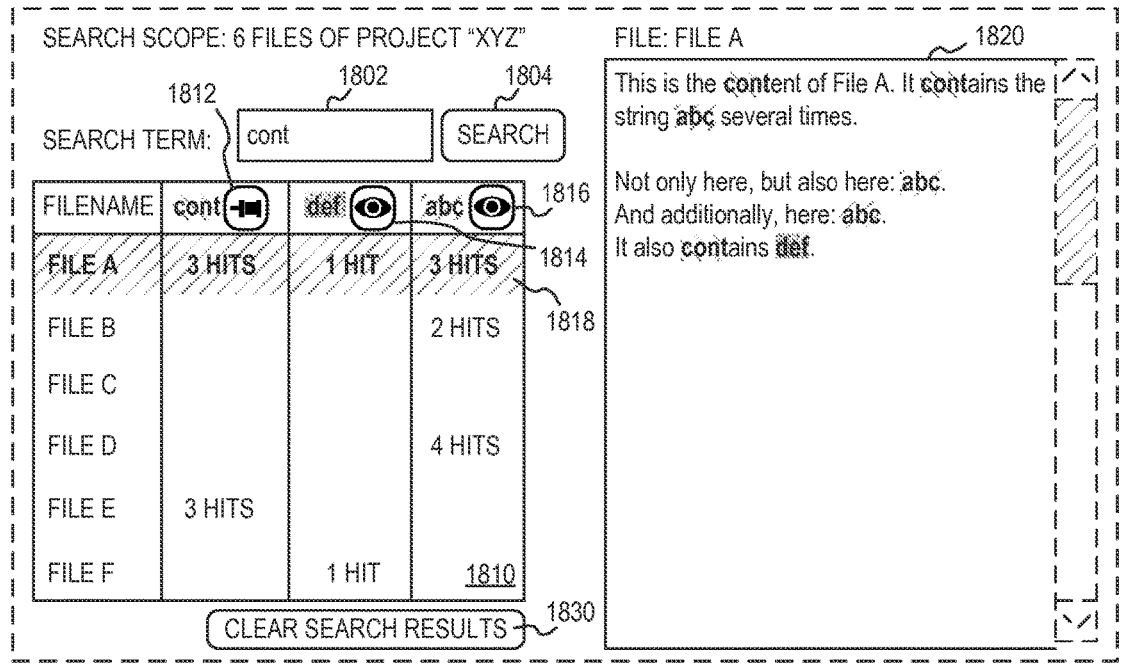
FIG. 18 shows a state of a graphical user interface after performing a search according to an embodiment of the present disclosure.

FIG. 18 shows a state of a graphical user interface 1800 after performing a search according to an embodiment of the present disclosure. The interface 1800 may appear subsequent to the interface 1700, when the pinning toggle button 1714 is selected. The interface 1800 may include several areas 1802, 1810, and 1820 for receiving input and/or providing output. Area 1802 is an input field for receiving a search term. Area 1810 is a viewing pane for displaying a list of files, and area 1820 is a viewing pane for displaying content of a selected file of the viewing pane 1810.

As shown, the search term in the example interface 1800 is "cont." Upon selection of search button 1804, search results may be displayed in the viewing pane 1810. The viewing pane 1810 also displays the pinned quantities of hits for the search terms, "def" and "abc," as described herein with reference to FIGS. 16 and 17. The viewing pane 1810 may also display the quantity of hits for each file in the scope of the search for the search term, "cont." In the example shown, File A is selected (1818) and its content is displayed in viewing pane 1820.

In viewing pane 1820, the search hits for the search term "cont" are displayed with the first visual indication. For example, the first visual indication may involve highlighting, bolding, underlining or dashing text. In viewing pane 1820, the search hit for the search term "def" is displayed with the second visual indication. For example, the second visual indication may involve highlighting, bolding, underlining or dashing text. The second visual indication may be different from the first visual indication. In viewing pane 1820, the search hits for the search term "abc" are displayed with a third visual indication. For example, the third visual indication may involve highlighting, bolding, underlining or dashing text. The third visual indication may be different from the first visual indication and the second visual indication.

Further, interface 1800 may include the pinning toggle button 1812 to pin the quantities of hits for the search term "cont" to the viewing pane 1810. This allows the user to view the quantities of hits for the search after a subsequent search or searches. In an embodiment, after a user selects the pinning toggle button 1812, the user may release button 1812 if the user wishes not to pin the quantities of hits for the search to the viewing pane 1810. The viewing pane 1810 may have sufficient space to display the quantities of hits for additional search terms. Interface 1800 may also include eye toggle button 1814, which can be selected to delete the second visual indication for the search term "def." In an embodiment, after a user selects the eye toggle button 1814, the user may release button 1814 if the user wishes to view the second visual indication for the search term "def." Interface 1800 may also include eye toggle button 1816, which can be selected to delete the third visual indication for the search term "abc." In an embodiment, after a user selects the eye toggle button 1816, the user may release button 1816 if the user wishes to view the third visual indication for the search term "abc."

Interface 1800 may also include the clear search results button 1830, which can be selected to delete the list of files and the quantities of hits for the search terms, "cont," "def," and "abc," from viewing pane 1810. In one embodiment, upon selecting clear search results button 1830, viewing pane 1810 may no longer display the search results for the search terms "cont," "def," and "abc," as shown in FIG. 13. Further, viewing pane 1820 may no longer display the search hits for the search terms, "cont," "def," and "abc," as shown in FIG. 13. In another embodiment, upon selecting clear search results button 1830, viewing pane 1820 may not display the content of a file.

Figure 19:
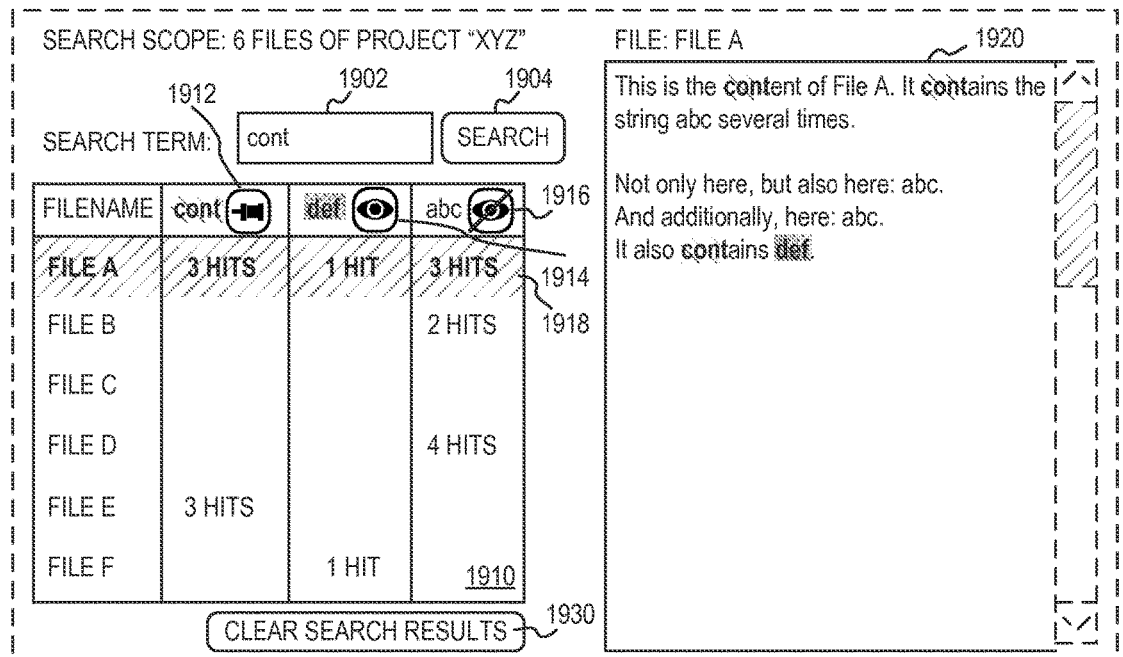
FIG. 19 shows a state of a graphical user interface after performing a search according to an embodiment of the present disclosure.

FIG. 19 shows a state of a graphical user interface 1900 after performing a search according to an embodiment of the present disclosure. The interface 1900 may appear subsequent to the interface 1800. The interface 1900 may include several areas 1902, 1910, and 1920 for receiving input and/or providing output. Area 1902 is an input field for receiving a search term. Area 1910 is a viewing pane for displaying a list of files, and area 1920 is a viewing pane for displaying content of a selected file of the viewing pane 1910.

As shown, the search term in the example interface 1900 is "cont." Upon selection of search button 1904, search results may be displayed in the viewing pane 1910.

The viewing pane 1910 also displays the pinned quantities of hits for the search terms, "def" and "abc," as described herein with reference to FIGS. 16 and 17. The viewing pane 1910 may also display the quantity of hits for each file in the scope of the search for the search term, "cont." In the example shown, File A is selected (1918) and its content is displayed in viewing pane 1920.

In viewing pane 1920, the search hits for the search term "cont" are displayed with the first visual indication. For example, the first visual indication may involve highlighting, bolding, underlining or dashing text. In viewing pane 1920, the search hit for the search term "def" is displayed with the second visual indication. For example, the second visual indication may involve highlighting, bolding, underlining or dashing text. In viewing pane 1920, the search hits for the search term "abc" are displayed with a third visual indication. For example, the third visual indication may involve highlighting, bolding, underlining or dashing text.

Further, interface 1900 may include the pinning toggle button 1912 to pin the quantities of hits for the search term "cont" to the viewing pane 1910. This allows the user to view the quantities of hits for the search after a subsequent search or searches. In an embodiment, after a user selects the pinning toggle button 1912, the user may release button 1912 if the user wishes not to pin the quantities of hits for the search to the viewing pane 1910. The viewing pane 1910 may have sufficient space to display the quantities of hits for additional search terms. In an embodiment, the viewing pane 1910 may include a scroll bar to accommodate content that does not fit into the viewing pane. Interface 1900 may also include eye toggle button 1914, which can be selected to delete the second visual indication for the search term "def." In an embodiment, after a user selects eye toggle button 1914, the user may release button 1914 if the user wishes to view the second visual indication for the search term "def." Interface 1900 may also include eye toggle button 1916, which can be selected to delete the third visual indication for the search term "abc." As shown, the eye toggle button 1916 is selected, and as a result, the third visual indication for the search term "abc" has been deleted from viewing pane 1920. In an embodiment, after a user selects the eye toggle button 1916, the user may release button 1916 if the user wishes to view the third visual indication for the search term "abc."

Interface 1900 may also include the clear search results button 1930, which can be selected to delete the list of files and the quantities of hits for the search terms, "cont," "def," and "abc," from viewing pane 1910. In one embodiment, upon selecting clear search results button 1930, viewing pane 1910 may no longer display the search results for the search terms, "cont," "def," and "abc," as shown in FIG. 13. Further, viewing pane 1920 may no longer display the search hits for the search terms, "cont," "def," and "abc," as shown in FIG. 3. In another embodiment, upon selecting clear search results button 1930, viewing pane 1920 may not display the content of a file.

Figure 20:
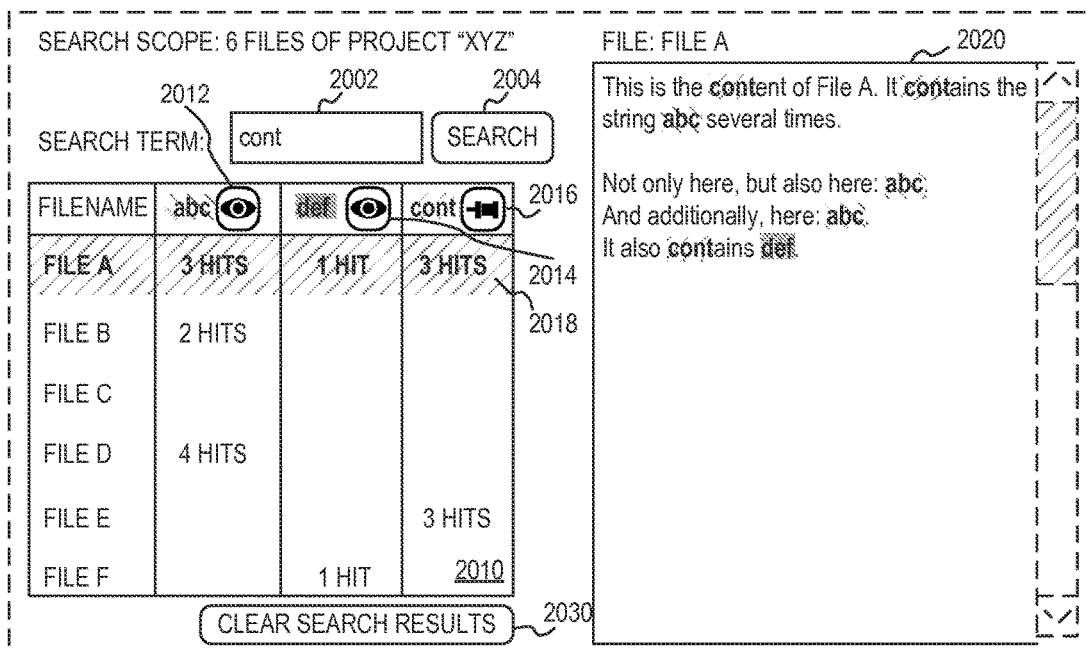
FIG. 20 shows a state of a graphical user interface after performing a search according to an embodiment of the present disclosure.

FIG. 20 shows a state of a graphical user interface 2000 after performing a search according to an embodiment of the present disclosure. The interface 2000 may appear subsequent to the interface 1700. The interface 2000 may include several areas 2002, 2010, and 2020 for receiving input and/or providing output. Area 2002 is an input field for receiving a search term. Area 2010 is a viewing pane for displaying a list of files, and area 2020 is a viewing pane for displaying content of a selected file of the viewing pane 2010.

As shown, the search term in the example interface 2000 is "cont." Upon selection of search button 2004, search results may be displayed in the viewing pane 2010. The viewing pane 2010 also displays the pinned quantities of hits for the search terms, "def" and "abc," as described herein with reference to FIGS. 16 and 17. The viewing pane 2010 may also display the quantity of hits for each file in the scope of the search for the search term, "cont." In the example shown, File A is selected (2018) and its content is displayed in viewing pane 2020.

In viewing pane 2020, the search hits for the search term "cont" are displayed with the third visual indication. For example, the third visual indication may involve highlighting, bolding, underlining or dashing text. In viewing pane 2020, the search hit for the search term "def" is displayed with the second visual indication. For example, the second visual indication may involve highlighting, bolding, underlining or dashing text. In viewing pane 2020, the search hits for the search term "abc" are displayed with a first visual indication. For example, the first visual indication may involve highlighting, bolding, underlining or dashing text.

Further, interface 2000 may include the pinning toggle button 2016 to pin the quantities of hits for the search term "cont" to the viewing pane 2010. This allows the user to view the quantities of hits for the search after a subsequent search or searches. In an embodiment, after a user selects the pinning toggle button 2016, the user may release button 2016 if the user wishes not to pin the quantities of hits for the search to the viewing pane 2010. The viewing pane 2010 may have sufficient space to display the quantities of hits for additional search terms. In an embodiment, the viewing pane 2010 may include a scroll bar to accommodate content that does not fit into the viewing pane. Interface 2000 may also include eye toggle button 2012, which can be selected to delete the first visual indication for the search term "abc." In an embodiment, after a user selects eye toggle button 2012, the user may release button 2012 if the user wishes to view the first visual indication for the search term "abc." Interface 2000 may also include eye toggle button 2014, which can be selected to delete the second visual indication for the search term "def." In an embodiment, after a user selects eye toggle button 2014, the user may release button 2012 if the user wishes to view the second visual indication for the search term "def."

Interface 2000 may also include the clear search results button 2030, which can be selected to delete the list of files and the quantities of hits for the search terms, "cont," "def," and "abc," from viewing pane 2010. In one embodiment, upon selecting clear search results button 2030, viewing pane 2010 may no longer display the search results for the search term "cont." Further, viewing pane 2020 may no longer display the search hits for the search term "cont" with the third visual indication. In another embodiment, upon selecting clear search results button 2030, viewing pane 2020 may not display the content of a file.

Figure 21:
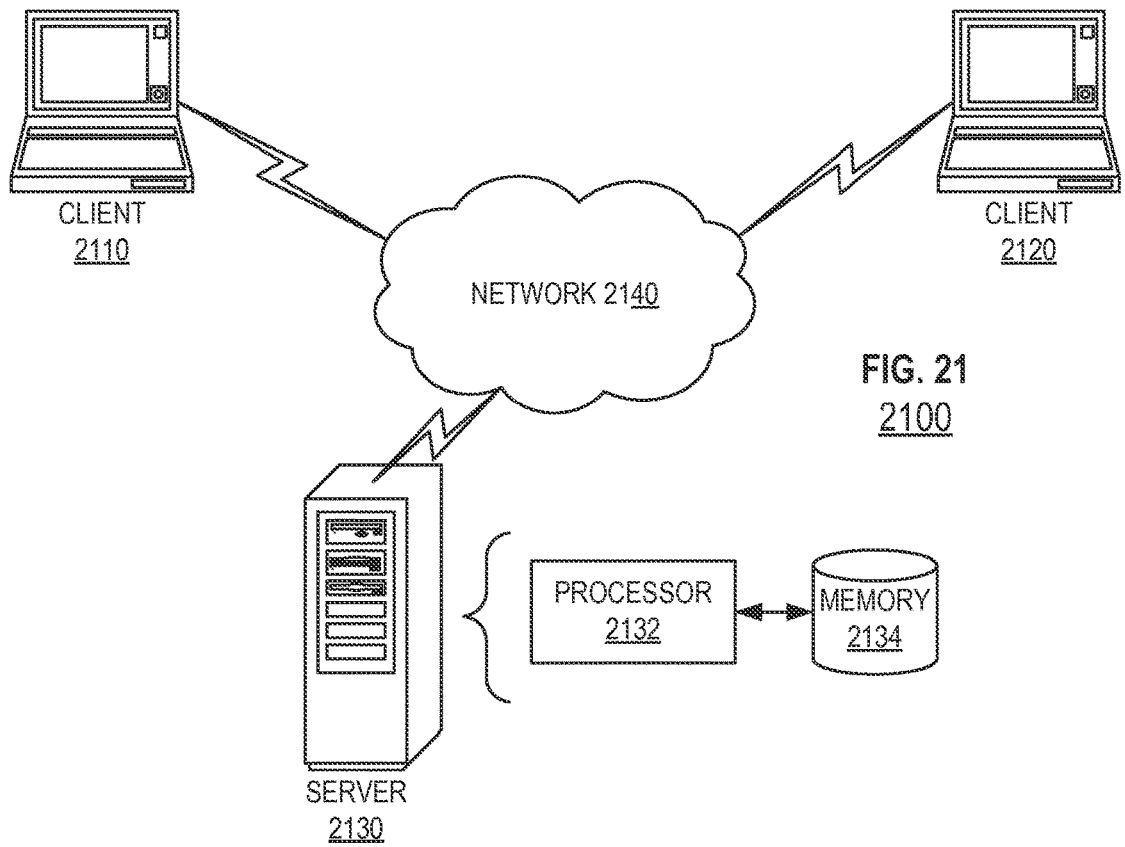
FIG. 21 is a simplified block diagram of a system implementing the methods described herein.

FIG. 21 is a simplified block diagram of a system 2100, which may be used to implement the methods and systems described herein. The system 2100 may include a plurality of clients 2110 and 2020 and a server 2130 interconnected via network 2140. The server may include a processor 2132 in communication with a computer-readable medium 2134. The computer-readable medium 2134 may be a database internal or external to the processor or external storage means. The computer-readable medium 2134 may include instructions executable by the processor such that when the processor executes various portions of the instructions, the instructions cause the processor to perform the various methods described herein. Each of the clients 2110 and 2120 can communicate with the processor 2132 to request applications stored in the server 2130. In an embodiment (not shown), more than one system 2100, including, for example, more than one instance of client 2110, can be used to carry out the embodiments of the present disclosure. The more than one instance of client 2110 may or may not communicate with each other.

Figure 22:
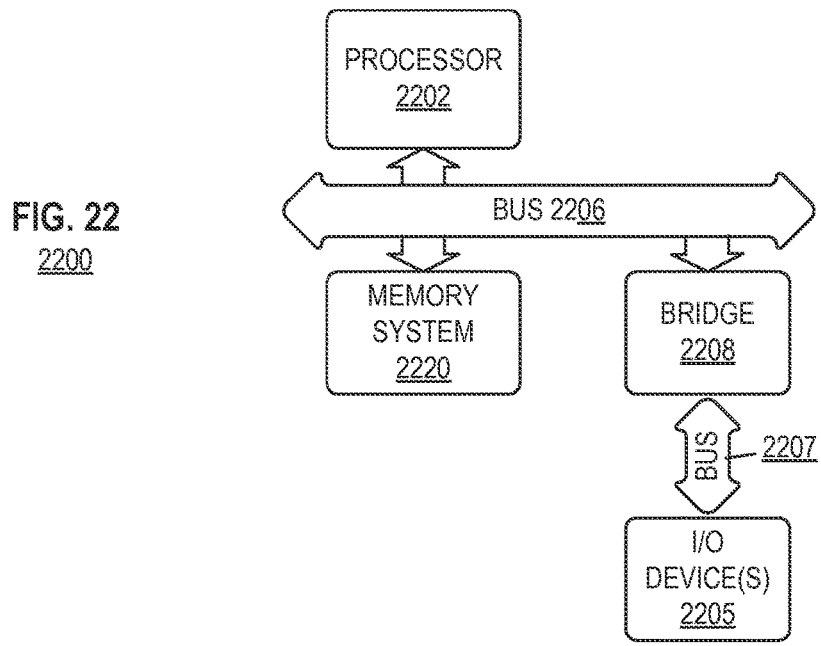
FIG. 22 is a simplified block diagram of a device implementing the methods described herein.

FIG. 22 is a simplified block diagram of a device 2200 implementing the methods and systems described herein. The device 2200 may include a processor 2202, a memory system 2220, and at least one input/output (I/O) device 2205. The processor may be implemented according to the methods and systems described herein. For example, the processor may be operable to perform the steps of methods 200, 400 and 1200 shown in FIGS. 2, 4 and 12.

The processor 2202, memory system 2220, and I/O device(s) 2205 may be communicatively coupled to each other. The communication may be implemented in a variety of ways, e.g., via at least one computer bus 2206 and/or bridge device 2208. In another embodiment, the communication may be implemented via computer bus 2206, bridge device 2208, computer bus 2207, and I/O device(s) 2205. The I/O device(s) 2205 may include network adapters and/or mass storage devices from which the device 2200 may receive commands for executing the methods described herein. The I/O device(s) 2205 may be implemented according to the methods and systems described herein. For example, the I/O device(s) may receive input from a user, e.g., a matching command.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together for the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the disclosure.

What is claimed is:

1. A computer-implemented method, comprising:
marking, at a user interface, at least one match to each of a plurality of queries for at least one file within a scope of a corresponding search;
displaying, at a user interface, a quantity of marked matches for the at least one file within the scope of the corresponding search for each of the plurality of queries;
displaying, at the user interface and concurrent with the displayed quantity of marked matches for each of the plurality of queries, content of one file within the scope of the search for a selected one of the plurality of queries, wherein the at least one marked match is visually distinguished from a rest of the content; and
displaying, at the user interface, a tooltip for the quantity of marked matches for the selected query.

2. The method of claim 1, further comprising:
receiving user-generated input via the user interface deleting the at least one marked match to the selected query for the at least one file within the scope of the search.

3. A computer-implemented method, comprising:
marking, at a user interface, at least one match to a first query for at least one file within a scope of search;
displaying, at the user interface, content of one file within the scope of the search for the first query, wherein the at least one marked match for the first query has a first visual distinction from a rest of the content;
marking, at the user interface, at least one match to a second query for at least one file within the scope of the search;
displaying, at the user interface concurrent with the marked at least one match to the second query, the content of one file within the scope of the search for the second query, wherein the at least one marked match for the second query has a second visual distinction from the rest of the content; and
displaying, at the user interface, a quantity of marked matches for the at least one marked match to the received first query; and
displaying, at the user interface, a quantity of marked matches for the at least one marked match to the received second query.

4. The method of claim 3, further comprising:
displaying, at the user interface, a tooltip for the quantity of marked matches for the first query and the second query.

5. The method of claim 3, further comprising:
deleting the at least one marked match to the second query for the at least one file within the scope of the search; and
deleting the second visual distinction from the user interface.

6. A computer-implemented method, comprising:
receiving, at a user interface, a first query and a scope of search;
identifying at least one match to the received first query within the scope of the search;
displaying, at the user interface, identification of files within the scope of the search; and
displaying, at the user interface concurrent with the displayed identification of files within the scope of the search, a quantity of matches for the identified at least one match to the received first query for at least one file within the scope of the search;
displaying, at the user interface concurrent with the displayed identification of files within the scope of the search and with the displayed quantity of matches for the identified at least one match to the received first query for at least one file within the scope of the search, content of one of the files within the scope of the search, wherein the identified at least one match to the received first query has a first visual distinction from a rest of the content;
receiving, at the user interface, a first pinning command;
receiving, at the user interface, a second query and the scope of the search;
identifying at least one match to the received second query within the scope of the search;
displaying, at the user interface, a quantity of matches for the identified at least one match to the received second query for at least one file within the scope of the search;
displaying, at the user interface and concurrent with the displayed quantity of matches for the identified at least one match to the received second query for at least one file within the scope of the search, in response to the first received pinning command, the content of one of the files within the scope of the search, wherein the identified at least one match to the received first query has a second visual distinction from the rest of the content; and
displaying, at the user interface and concurrent with the displayed quantity of matches for the identified at least one match to the received second query for at least one file within the scope of the search and with the content of one of the files within the scope of the search, the content of one of the files within the scope of the search, wherein the identified at least one match to the received second query has the first visual distinction from the rest of the content.

7. The method of claim 6, further comprising:
displaying, at the user interface, a tooltip for the identified files within the scope of the search.

8. The method of claim 6, further comprising:
deleting the identified at least one match to the received first query within the scope of the search; and
deleting the identified at least one match to the received second query within the scope of the search.

9. The method of claim 6, further comprising:
receiving a second pinning command;
receiving a third query and the scope of the search;
identifying at least one match to the received third query within the scope of the search;
displaying, at the user interface, a quantity of matches for the identified at least one match to the received third query for at least one file within the scope of the search;
displaying, at the user interface, in response to the first pinning command, the content of one of the files within the scope of the search, wherein the identified at least one match to the received first query has a third visual distinction from the rest of the content;
displaying, at the user interface, in response to the second pinning command, the content of one of the files within the scope of the search, wherein the identified at least one match to the received second query has the second visual distinction from the rest of the content; and displaying, at the user interface, the content of one of the files within the scope of the search, wherein the identified at least one match to the received third query has the first visual distinction from the rest of the content.

10. The method of claim 9, further comprising:
displaying, at the user interface, the content of one of the files within the scope of the search, wherein the identified at least one match to the received first query has no visual distinction from the rest of the content.

11. The method of claim 9, further comprising:
displaying, at the user interface, the content of one of the files within the scope of the search, wherein the identified at least one match to the received second query has no visual distinction from the rest of the content.

12. A non-transitory computer-readable medium storing program instructions that, when executed, cause a processor to automatically perform an action, the method comprising:

receiving, at a user interface, a first query and a scope of search;

identifying at least one match to the received first query within the scope of the search;

displaying, at the user interface, identification of files within the scope of the search; and displaying, at the user interface concurrent with the displayed identification of files within the scope of the search, a quantity of matches for the identified at least one match to the received first query for at least one file within the scope of the search;

displaying, at the user interface concurrent with the displayed identification of files within the scope of the search and with the displayed quantity of matches for the identified at least one match to the received first query for at least one file within the scope of the search, content of one of the files within the scope of the search, wherein the identified at least one match to the received first query has a first visual distinction from a rest of the content;

receiving, at the user interface, a first pinning command;

receiving, at the user interface, a second query and the scope of the search;

identifying at least one match to the received second query within the scope of the search;

displaying, at the user interface, a quantity of matches for the identified at least one match to the received second query for at least one file within the scope of the search;

displaying, at the user interface and concurrent with the displayed quantity of matches for the identified at least one match to the received second query for at least one file within the scope of the search, in response to the first received pinning command, the content of one of the files within the scope of the search, wherein the identified at least one match to the received first query has a second visual distinction from the rest of the content; and displaying, at the user interface and concurrent with the displayed quantity of matches for the identified at least one match to the received second query for at least one file within the scope of the search and with the content of one of the files within the scope of the search, the content of one of the files within the scope of the search, wherein the identified at least one match to the received second query has the first visual distinction from the rest of the content.

* * * * *